(12) United States Patent
Johansson et al.

(10) Patent No.: US 10,140,611 B1
(45) Date of Patent: Nov. 27, 2018

(54) ELECTRONIC DEVICE WITH LIGHT-GENERATING SOURCES TO ILLUMINATE AN INDICIUM

(71) Applicant: Amazon Technologies, Inc., Reno, NV (US)

(72) Inventors: Jesper M. Johansson, Redmond, WA (US); Michael Carr, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 13/681,252

(22) Filed: Nov. 19, 2012

(51) Int. Cl.
*G06Q 20/12* (2012.01)
*G06Q 20/38* (2012.01)

(52) U.S. Cl.
CPC ......... *G06Q 20/382* (2013.01); *G06Q 20/127* (2013.01)

(58) Field of Classification Search
USPC ............................................. 705/50, 75, 27
See application file for complete search history.

(56) References Cited

U.S. PATENT DOCUMENTS

| | | | |
|---|---|---|---|
| 5,794,207 A * | 8/1998 | Walker ................. | G06Q 10/02 705/26.4 |
| 6,577,080 B2 | 6/2003 | Lys et al. | |
| 6,771,766 B1 * | 8/2004 | Shafiee ............... | H04M 3/5191 379/265.09 |
| 6,850,917 B1 * | 2/2005 | Hom .................... | G06Q 20/206 705/18 |
| 7,646,029 B2 | 1/2010 | Mueller et al. | |
| 7,680,819 B1 * | 3/2010 | Mellmer ................ | G06F 21/31 707/783 |
| 7,835,951 B1 * | 11/2010 | Burger ................ | G06Q 10/087 705/28 |
| 7,945,774 B2 * | 5/2011 | Ganesan ................ | H04L 63/06 713/151 |
| 2006/0117021 A1 * | 6/2006 | Sidney ................... | G16H 10/60 |
| 2006/0133061 A1 | 6/2006 | Maeda | |

(Continued)

OTHER PUBLICATIONS

Office Action for U.S. Appl. No. 15/046,168, dated Aug. 22, 2017, Cody Peterson, Indicium Illumination, 15 pages.

(Continued)

*Primary Examiner* — Mamon Obeid
*Assistant Examiner* — El Mehdi Oussir
(74) *Attorney, Agent, or Firm* — Lee & Hayes, PC (57) ABSTRACT

This disclosure is directed to, in part, providing a third party with access to at least some information in a user's account maintained by a host. The agent may assist a user in selecting an item, purchasing the item, customizing the item, and/or performing other actions. The agent may interact with the user during the assistance. In various embodiments, the user may provide the agent with a token that allows the agent to gain at least temporary access to at least a portion of the user's account. In some instances, the agent may purchase the item for the user using information in the user's account, such as payment information, shipping address information, and/or other information. The agent may place an item, such as a special order item in a virtual shopping cart or other location, which may be stored with the user's account.

26 Claims, 7 Drawing Sheets

(56) References Cited

U.S. PATENT DOCUMENTS

| | | | | |
|---|---|---|---|---|
| 2006/0235795 | A1* | 10/2006 | Johnson | G06Q 20/02 |
| | | | | 705/44 |
| 2007/0250920 | A1* | 10/2007 | Lindsay | G06F 21/31 |
| | | | | 726/7 |
| 2007/0294403 | A1* | 12/2007 | Verona | G06F 17/30306 |
| | | | | 709/225 |
| 2009/0228368 | A1* | 9/2009 | Brown | G06Q 20/02 |
| | | | | 705/26.1 |
| 2009/0233579 | A1* | 9/2009 | Castell | G06Q 20/105 |
| | | | | 455/411 |
| 2009/0234753 | A1* | 9/2009 | Shi | G06Q 30/0601 |
| | | | | 705/26.1 |
| 2009/0234878 | A1* | 9/2009 | Herz | G06Q 20/383 |
| 2010/0174689 | A1* | 7/2010 | Maeda | G06F 21/6218 |
| | | | | 707/694 |
| 2011/0112931 | A1* | 5/2011 | Hu | G06O 20/382 |
| | | | | 705/26.35 |
| 2012/0135718 | A1* | 5/2012 | Amidon | H04M 3/42374 |
| | | | | 455/414.1 |
| 2012/0136752 | A1* | 5/2012 | Gupta et al. | 705/26.8 |
| 2012/0290332 | A1* | 11/2012 | Bradshaw | G06Q 30/0629 |
| | | | | 705/4 |
| 2013/0282525 | A1* | 10/2013 | Hampton | G06Q 30/06 |
| | | | | 705/26.43 |
| 2015/0179141 | A1 | 6/2015 | Dabhi | |

OTHER PUBLICATIONS

PCT Search Report and Written Opinion dated Sep. 7, 2017 for PCT application No. PCT/US2017/035062, 6 pages.

* cited by examiner

ELECTRONIC DEVICE WITH LIGHT-GENERATING SOURCES TO ILLUMINATE AN INDICIUM

BACKGROUND

The Internet has evolved from primarily a vast repository of reference information to a conduit for sharing electronic information. People are able to perform many functions via the Internet, such as conduct complex banking functions, purchase goods and services, engage in social networking, and communicate with businesses or other people using sophisticated websites. This evolution has been fueled in part by increased security in these exchanges and increased behavioral acceptance of sharing personal information (e.g., payment information, etc.) with another party.

Many entities offer goods and services to users via electronic sites (e.g., websites, peer-to-peer systems, file transfer protocol (FTP) systems, etc.). Some entities may host their own electronic site while others may use a third party to provide some or all of the electronic data for a site. Regardless of a configuration and host of each electronic site, the sites are typically isolated from one another for various reasons, one of which is an inherent competition between the various electronic sites (e.g., competition between entities, etc.). Another reason is to increase security and privacy of users. Yet another reason is a difficulty in sharing information between entities when each entity has a unique system (e.g., legacy system, etc.) that is inflexible and cannot easily share information.

During user interactions with an entity at an electronic site, the entity may be able to collect significant amounts of information from the user that may include preferences of the user, payment information, address information, and other user information. However, this information is often constrained to user interactions with the respective electronic site.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to, in part, providing a third party (such as an agent) with access to at least some information in a user's account maintained by a host. In some embodiments, the host may provide an electronic marketplace that allows users to perform one or more tasks such as view items, select items for consumption, and/or conduct transactions. The items may include goods, services, or both. The agent may assist a user in selecting an item, purchasing the item, customizing the item, and/or performing other actions with one or more items on behalf of the user. The agent may interact with the user during the assistance, such as by talking with the user during a voice-based communication and/or exchanging written messages during a messaging communication. For example, the agent may provide sales assistance to the user via a call center to help the user select an appropriate item that meets the needs of the user.

In various embodiments, the user may provide the agent with a token that allows the agent to gain at least temporary access to at least a portion of the user's account. In some instances, the agent may purchase the item for the user using information in the user's account, such as payment information, shipping address information, and/or other information. The agent may place an item, such as a special order item in a virtual shopping cart or other location, which may be stored with the user's account. In this situation, the user may then initiate the purchase of the item that the agent stored in the user's account.

The techniques and systems described herein may be implemented in a number of ways. Example implementations are provided below with reference to the following figures.

Illustrative Environment

Figure 1:
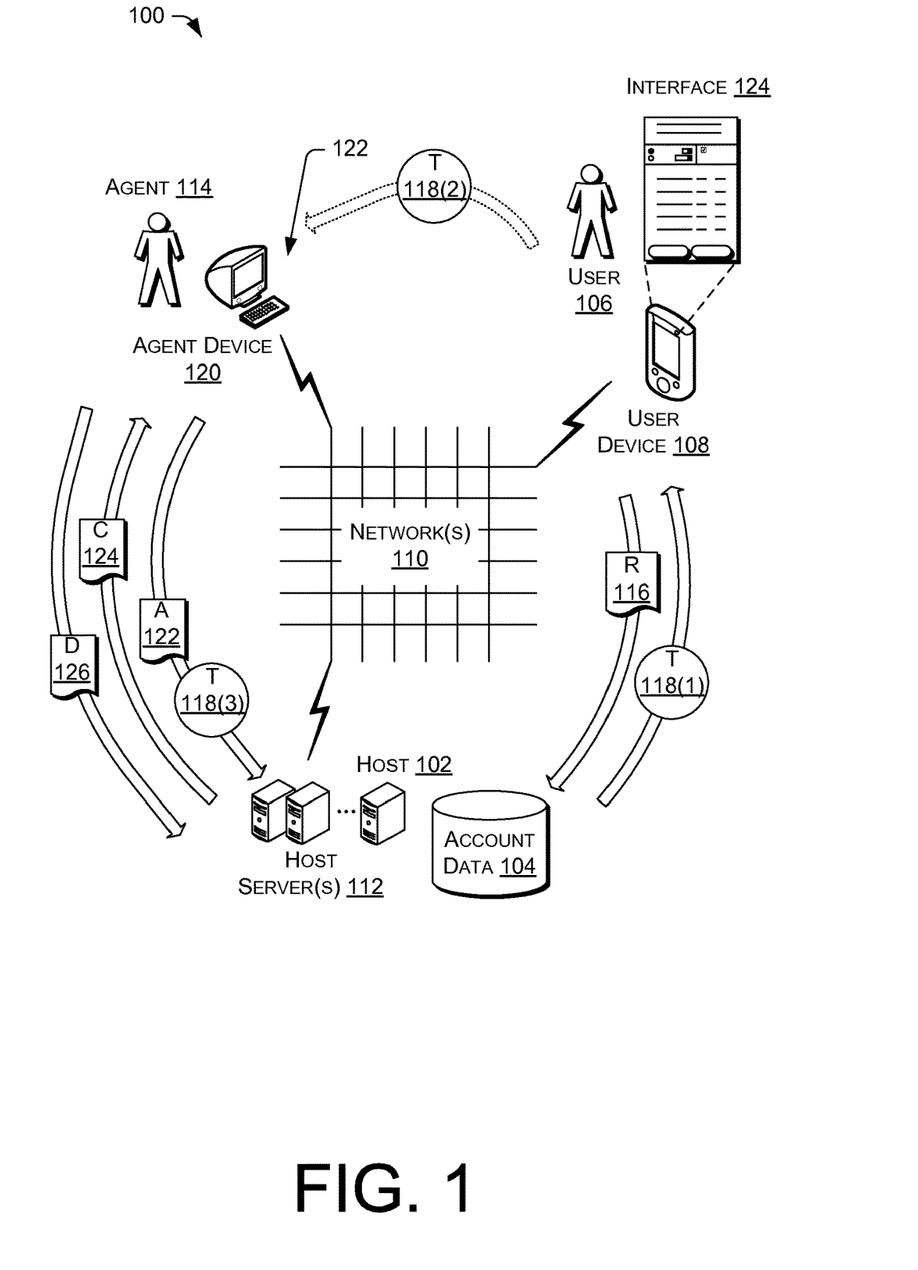
FIG. 1 is a schematic diagram of an illustrative computing environment usable to provide customer authorization for third party operations.

FIG. 1 is a schematic diagram of an illustrative computing environment 100 usable to provide customer authorization for third party operations. The environment 100 may include a host 102 that stores account data 104 for a user 106. The account data 104 may include one or more payment accounts (e.g., payment instruments, payment types, etc.), which may provide the user 106 with access to credit card information, bank account information (e.g., checking account(s), savings account(s), investment account(s), etc.), stored value cards, gift cards, or other types of payment instruments. The user 106 may make payments with his or her payment account(s). The account data 104 may also include shipping address information, contacts, transaction history, user preferences, and/or other information.

The host 102, meanwhile, may process transactions with the user 106 such as when the user purchases an item from the host 102. In some embodiments, the host 102 may provide an electronic marketplace that allows the user to perform one or more tasks such as view items, select items for consumption, and/or conduct transactions. The items may include goods, services, or both.

The user 106 may access the account data 104 using a user device 108. The user device 108 may be a mobile telephone, a smart phone, a tablet computer, a laptop computer, a netbook, a personal digital assistance (PDA), a gaming device, a media player, or any other mobile computing device that includes a display and can connect to a network(s) 110 to exchange information with host servers 112 of the host 102.

The network(s) 110 may include wired and/or wireless networks that enable communications between the various computing devices described in the environment 100. In some embodiments, the network(s) 110 may include local area networks (LANs), wide area networks (WAN), mobile telephone networks (MTNs), and other types of networks, possibly used in conjunction with one another, to facilitate communication between the various computing devices (i.e., the user device 108, the host servers 112, and/or the agent device 120). The computing devices are described in greater detail with reference to FIGS. 2A-2C.

In accordance with one or more embodiments, the user 106 may authorize an agent 114 to access at least some of the account data 104 on behalf of the user 106. The agent 114 may be a sales representative or other person or algorithm that helps the user 104 perform a transaction. The agent 114 may help the user 106 during an in-person session, during a call, and so forth. After the agent 114 is authorized to access the account data 104, the agent may use the account data to assist the user 106. For example, the user 106 may interact with the agent 114 to allow the agent to select a customized item for the user 106. For example, the agent 114 may select the customized item when assisting the user during a telephone-based order. The agent 114 may then store the customized item in the account data 104 for later retrieval by the user 106. In some instances, the agent 114 may initiate a purchase of the customized item on behalf of the user 106 using payment information, shipping information, and/or other information that is stored in the account data 104 and accessible by the agent as described herein.

In various embodiments, the user 106 may transmit a request 116 to the host to provide the user 104 (or possibly the agent 114) a token that provides limited access to the account data 104. The request 116 may follow or include authentication information provided by the user 106, such as user credentials and/or account information. The request 116 may include various parameters, such as restrictions, limitations, expirations, and/or other conditions, which may be specified in part by the user 106. In some embodiments, the host 102 may generate a token 118 for use by the agent 114 to access the account data 104. In some instances, the host 102 may transmit a token 118(1) to the user 106, via the user device 108. In some embodiments, the token 118(1) may be encrypted by the host servers 112.

The user 106 may then transmit the token 118(2) to the agent 114. The token 118(2) may be the same token as the token 118(1) or a modified version of the token 118(1). The modified version may include an additional signature, a decryption, and/or other modifications. In some embodiments, the host 102 may, after direction by the user 106, transmit the token 118 directly to the agent 114 via an agent device 120, in some instances. The agent 114 may use (or redeem) the token 118(3) to gain access to the account data 104. The token 118(3) may be the same token as the token 118(1) or the token 118(2), or may be a modified version of the token 118(1) or 118(2). In some embodiments, the agent 114 may provide authentication information 122 to the host 102 before, after, or with the token 118. The authentication information 122 may verify an identity of the agent 114. For example, the authentication information 112 may be used to limit a number of entities that can use the token 118, thereby possibly reducing undesirable activity related to access of the account data 104.

After the agent 114 has redeemed the token 118(3) to the host 102 (and possibly after the authentication information 122 is verified), the host 102 may provide a confirmation 124 to the agent to acknowledge receipt and acceptance of the token 118(3) and authentication information 122. The agent 114 may then transmit data 126 to the host 102 to interact with the account data 104. The data 126 may be a request to access the account data 104 and/or may be data used to update or modify the account data 104 (e.g., add an item to a shopping cart, purchase an item, process a return, update data in the account, etc.). The agent 114 may access at least some of the account data 104 that is authorized for access by the token 118 per the request 116. In various embodiments, the host 102 may perform an another authorization process with the user 106 prior to updating the account data 104 in response to an action by the agent 114, such as before processing a payment request issued by the agent that uses payment information in the account data 104. The authorization process may include calling the user 104, exchanging a message via a dedicated application running on the user device 108, and/or using other communications that allow the user 106 to allow or deny a specified action (e.g., actions performed by the agent 114).

The user device 108 may render an interface 128 that enables the user 106 to request the token, set parameters associated with the token, cancel a token, and/or perform other operations. The interface 128 may be provided by a dedicated application running on the user device 108 and/or by accessing a page provided by the host 102, such as a webpage that allows the user 106 to access at least some of the account data 104.

Figure 2A:
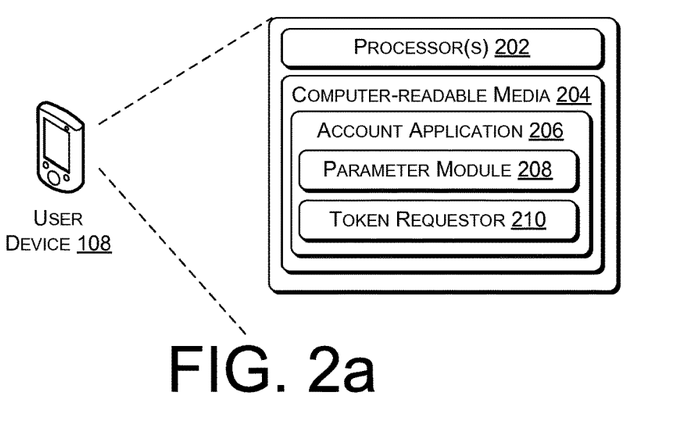
FIGS. 2a-2c are block diagrams of illustrative computing architecture of various devices included in the computing environment of FIG. 1.
Figure 2B:
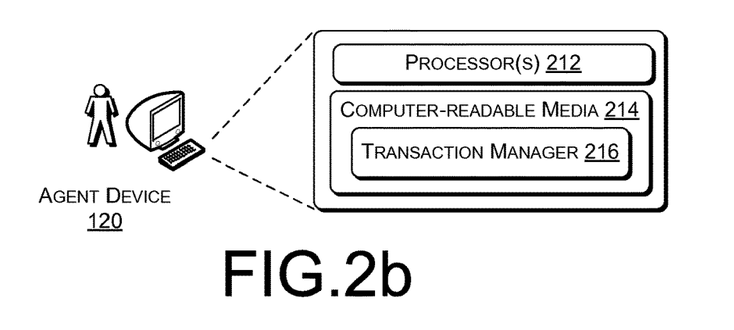
Figure 2C:
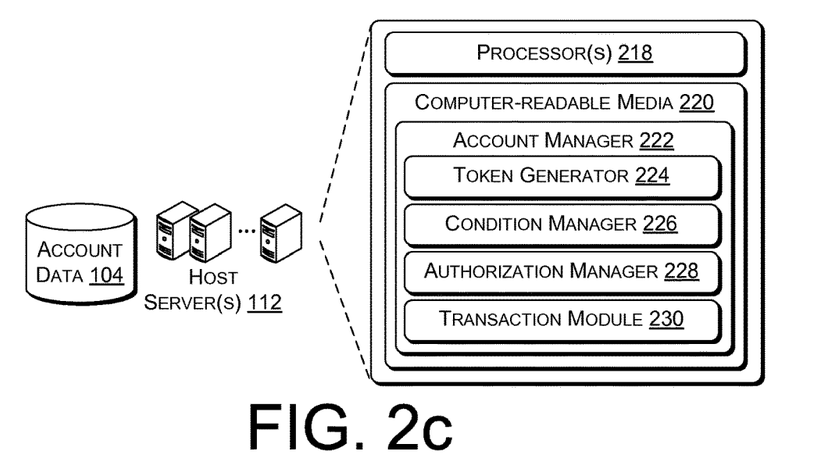

FIGS. 2a-2c are block diagrams of illustrative computing architecture of various devices included in the computing environment 100 shown in FIG. 1.

FIG. 2a shows illustrative computing architecture of the user device 108. The architecture may include processors(s) 202 and computer-readable media 204. The computer-readable media 204 may store various modules, applications, programs, or other data. The computer-readable media 204 may include instructions that, when executed by the processor(s) 202, cause the processors to perform the operations described herein for the user device 108. In some embodiments, the computer-readable media 204 may store an account application 206 to facilitate management of the account data 104 and/or creation of the token 118. The account application 206 may further include a parameter module 208 and a token requestor 210. Each module is discussed in turn.

The parameter module 208 may provide at least a portion of the interface 128, which is further described with reference to FIG. 5. The parameter module 208 may enable the user 106 to specify restrictions, limitations, expirations, and/or other conditions associated with the agent's use of the account data 104 that is granted by the token 118. Thus, the host 102, when redeeming the token 118, may limit the use of the account data 104 based on the parameters associated with the token 118. Thus, the user 106 may create or select parameters that are then enforced by the host 102 after the agent 114 redeems the token 118. In some instances, the parameters may include masking data in the account data 104 to obscure some details from the agent while maintaining the data for actual use. For example, a shipping address may be partially obscured so that the agent 114 cannot determine an exact address, but can select the address for delivery of an item, for example. Similarly, payment types may be at least partially obscured so that the agent cannot reproduce the payment types.

The token requestor 210 may request the token 118 from the host servers 112. In some embodiments, the token requestor 210 may obtain and/or transmit user credentials, the parameters created using the parameter module 208, and/or other data to the host servers 112 with the request. In some embodiments, the token requestor 210 may be accessible via another user device different than the user device 108 such as a desktop computer or personal computer that may be used by the user 106 to request the token 118.

FIG. 2*b* shows illustrative computing architecture of the agent device 120. The architecture may include processors(s) 212 and computer-readable media 214. The computer-readable media 214 may store various modules, applications, programs, or other data. The computer-readable media 214 may include instructions that, when executed by the processor(s) 212, cause the processors to perform the operations described herein for the agent device 120. In some embodiments, the computer-readable media 214 may store a transaction manager 216. The transaction manager 216 may facilitate receipt of the token 118. In some instances, the transaction manger 216 may receive the token from the user 106. For example, the user 106 may verbally divulge the token 118 to the agent 114. In another example, the user 106 may transmit the token 118 to the agent via the user device 108. In various instances, the host servers 112 may transmit the token 118 directly to the transaction manager 216 after authorization by the user 106. The transaction manager 216 may allow the agent 114 to access the account data 104 when the token 118 is a correct token and, in some instances, when the agent 114 is authorized to access the data by another authorization process, such as by providing correct credentials to the host servers 112. The extra layer of security (use of the other authorization process) may limit redemption of the token 118 to approved parties, and thereby reduce risk while limiting entities that can act as the agent 114. The transaction manager 216 may allow the agent to add an item to the account data 104, purchase an item, customize an item, ship an item, and/or perform other actions for one or more items using the account data 104.

FIG. 2*c* shows illustrative computing architecture of the host servers 112. The architecture may include processors(s) 218 and computer-readable media 220. The computer-readable media 220 may store various modules, applications, programs, or other data. The computer-readable media 220 may include instructions that, when executed by the processor(s) 218, cause the processors to perform the operations described herein for the host servers 112. In some embodiments, the computer-readable media 220 may store an account manager 222 that facilitates creation and transmission of the token 118, and receipt of the token from the agent 114. The account manager 222 may further include a token generator 224, a condition manager 226, an authorization manager 228, and a transaction module 230. Each module is discussed in turn.

The token generator 224 may receive the request 116 for the token 118 from the user device 108. The request 116 may include user credentials (e.g., username, password, etc.), an amount, conditions, an expiration time and/or other data. The account manager 222 and/or the token generator 224 may verify the user credentials. In some instances, the token 118 may be associated with one or more particular payment instruments and/or payment types in the account data 104. When the user credentials are correct, the token generator 224 may generate a unique token that is associated with the account data 104 and is subject to the conditions and expiration time specified by the condition manager 226, which may include default conditions/parameters. The token generator 224 may encrypt the token and then transmit the token to the user device 108 and/or the agent device 120. However, at least a portion of the condition information, expiration time, and other data may remain with the host servers 112 and may or may not be transmitted to the user device 108.

The condition manager 226 may manage the conditions associated with the token. The conditions may be created based on data received from the parameter module 208. The conditions may include an expiration time, restrictions on use (e.g., restricted use to specified recipients, categories of goods/services, etc.), restrictions on payment types, restrictions on access to shipping addresses and contacts information and/or other types of restrictions. The condition manager 226 may determine whether the conditions are met upon receipt of the token 118 and or the condition manager 226 may enforce the conditions while the agent 114 interacts with the account data 104.

The authorization manager 228 may verify that the conditions are satisfied using the condition manager 226. In some embodiments, the authorization manager may transmit a message to the user 106 to allow the user to allow or deny a requested change to the account data 104 by the agent 114, such as a purchase of an item initiated by the agent using a payment type stored in the account data 104.

The transaction manager 230 may conduct a transaction initiated by the agent 114 on behalf of the user 106. The transaction may be a purchase of an item selected by the agent and/or the storing of the item in the account data 104, such as in a virtual shopping cart maintained by the account data 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download. Thus, the computer-readable media used by the user device 108, the agent device 120, and/or the host servers 112 may be implemented at the computer program product as described above.

Illustrative Operation

FIGS. 3A, 3B, 4, and 6 show various processes related to use of the token 118 to provide that agent with at least some access to the account data 104. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3A:
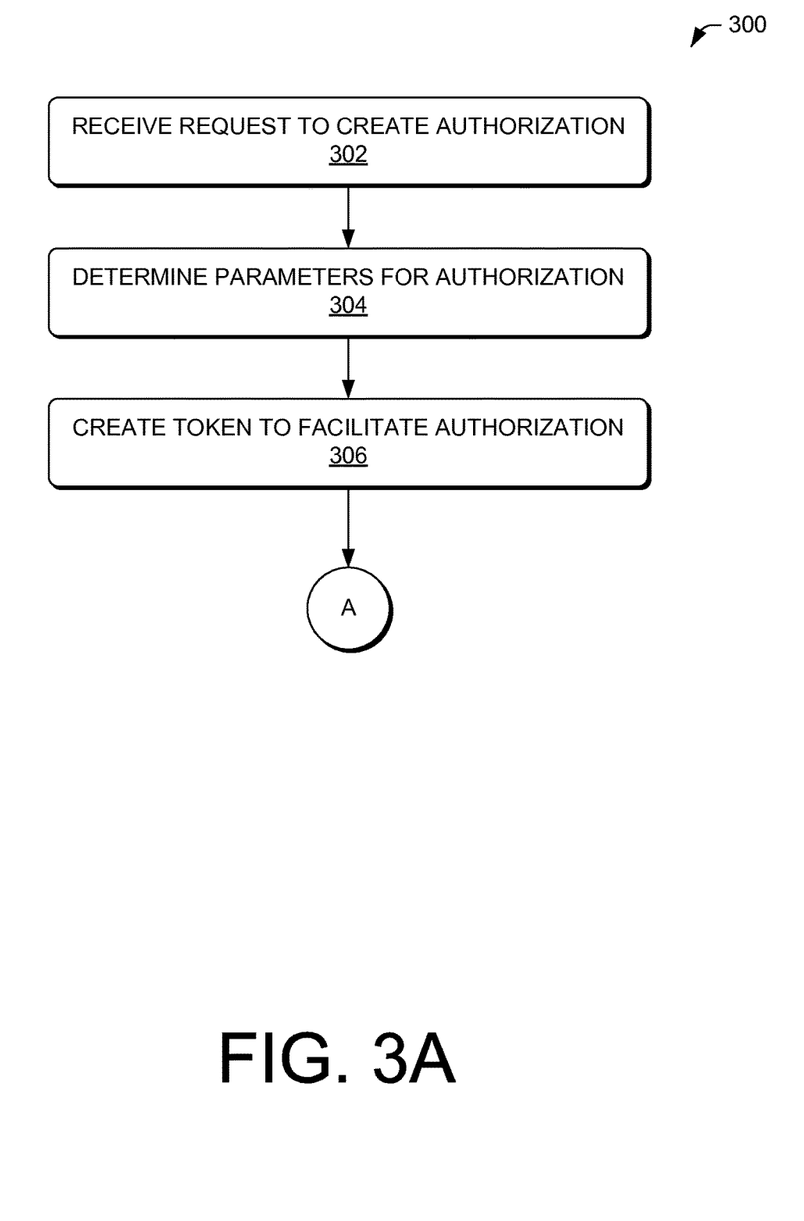
FIGS. 3A and 3B are flow diagrams of illustrative processes to authorize a third party to perform an action that involves gaining access to a customer's account.
Figure 3B:
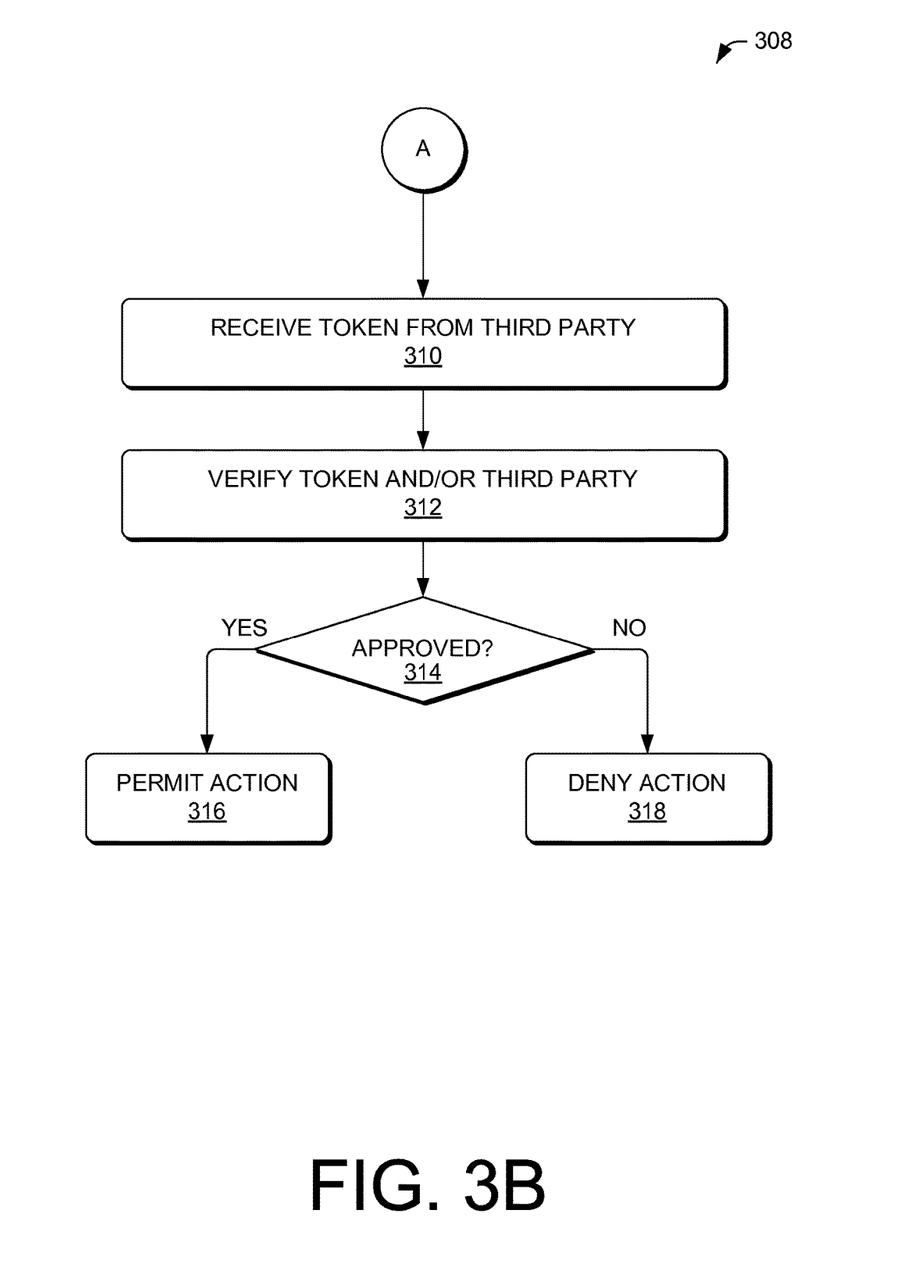

FIGS. 3A and 3B are flow diagrams of illustrative processes to authorize a third party or agent to perform an action that involves gaining access to a customer's account. The processes shown in FIGS. 3A and 3B are described with reference to the environment 100 and may be performed by the host servers 112. Of course, the processes may be performed in other similar and/or different environments. FIG. 3A shows an illustrative process 300 involving creation of a token.

At 302, the token generator 224 may receive a request from the user 106 to create an authorization to allow the agent 114 to access the account data 104. The request may be initiated by the account application 206 on the user device 108 and/or using an interface, such as the interface 128.

At 304, the condition manager 226 may determine parameters for the authorization. The parameters may be provided by the parameter module 208, and may include parameters such as restrictions, limitations, expirations, and/or other conditions for access to the account data 104 and/or use of the account data 104 by the agent 114.

At 306, the token generator 224 may create the token 118 to facilitate authorization by the user 106 for the agent 114 to access the account data 104 on behalf of the user 106. The user 106 may then provide the token 118 to the agent, such as during a telephone call when the agent is assisting the user 106 or at other times. In some instances, the host 102 may transmit the token directly to the agent 114 after the user 106 designates the agent 114 to receive the token 118.

FIG. 3B shows an illustrative process 308 involving redemption of the token and access to the account data 104.

At 310, the authorization manager 228 may receive the token 118 from the agent 114 when the agent redeems the token to gain access to the account data 104.

At 312, the authorization manager 228 may verify the token and/or the authentication information provided by the agent 114. For example, the agent 114 may be required to enter credentials or other data prior to, during, or after redeeming the token 118.

At 314, the authorization manager 228 may determine whether the agent 114 is approved to access at least some of the account data 104. When the agent 114 is approved and the token 118 is valid (following the "yes" route from the decision operation 314), then the process 300 may advance to an operation 316 and may permit access by the agent 114 to at least a portion of the account data 104. The access may include allowing the agent to perform one or more of: (1) add an item to the account, (2) purchase the item using a payment type stored in the account, (3) access payment information, contact information, or transaction information, and/or (4) modify data in the account. The modification may include at least one of processing a return, updating payment information, updating contact information, or updating transaction information. When the agent 114 is not approved or the token 118 is not valid (following the "no" route from the decision operation 314), then the process 300 may advance to an operation 318 and may deny access by the agent 114 to the account data 104.

Figure 4:
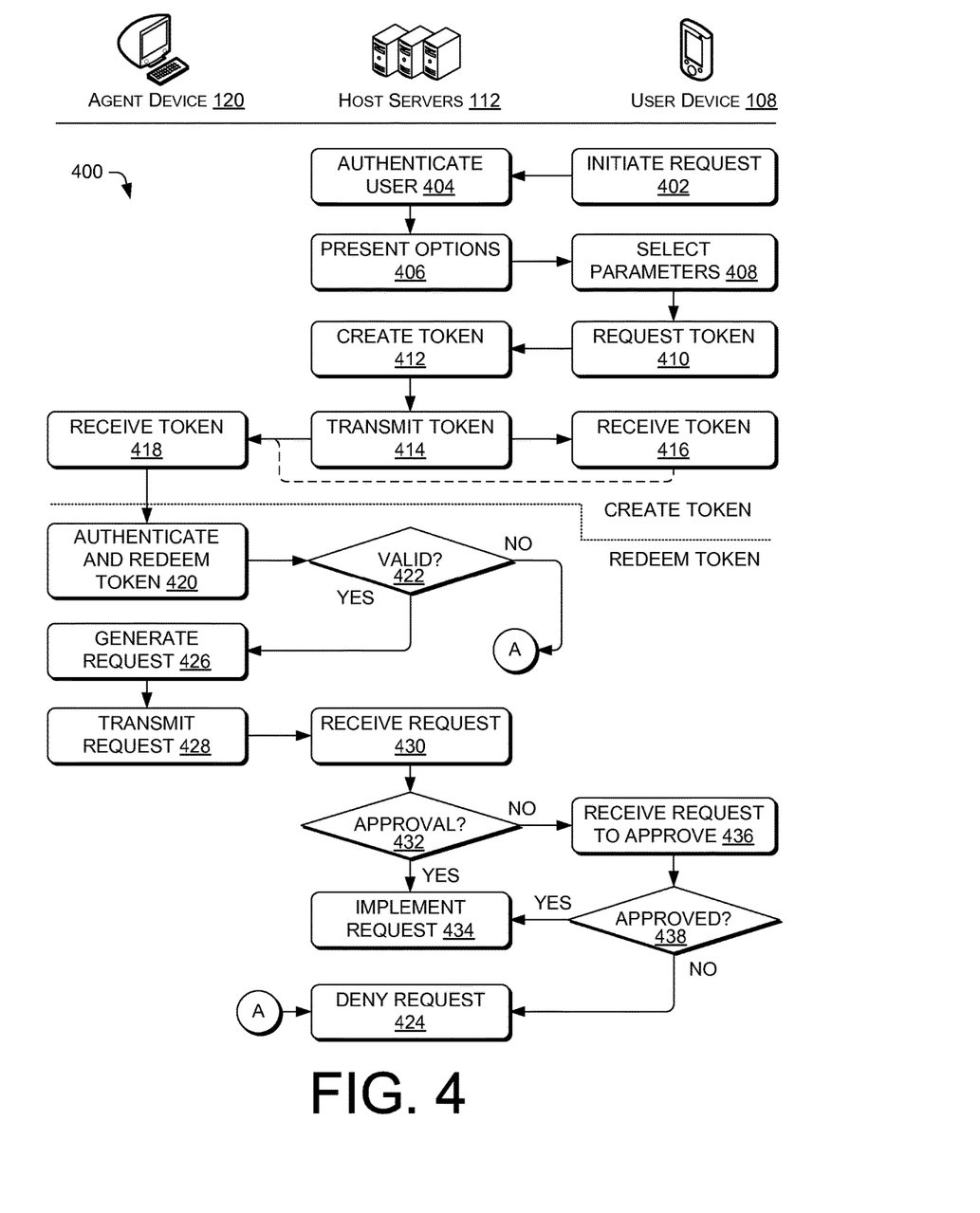
FIG. 4 is a flow diagram of an illustrative process to enable creation and use of a token that provides access to a customer's account by a third party.

FIG. 4 is a flow diagram of an illustrative process 400 to enable creation and use of a token that provides access to a customer's account by an agent. The process 400 shows operations organized under devices that may perform the operations. However, the operations may be performed by other devices. The process 400 is described with reference to the environment 100. Of course, the process 400 may be performed in other similar and/or different environments. The process 400 includes two distinct sets of operations. A first set are the operations involving creation of a token and a second set of operations involving redemption of the token and access to the account data 104.

The process 400 may be initiated through a communication between the user 106 and the agent 114 or between a communication between the user 106 and the host 102. In the former scenario, the agent 114 may direct the user 106 to obtain the token 118 to allow the agent to access the account data 104. The user 106 may continue to interact with the agent 114 after obtaining the token 118. In the latter scenario, the user 106 may obtain the token and then interact with the agent 114.

At 402, the account application 206 may initiate a request to the host servers 112 to authorize the agent 114 to access at least some of the account data 104 of the user 106. For example, the user 106 may log into an account provided by the host servers 112 that includes access to the account data 104.

At 404, the account manager 222 may authenticate the user 404. For example, the authentication may verify user credentials prior to providing the user 106 with access to the account.

At 406, the token generator 224 and/or the condition manager 226 may present options to the user 106 for selection. For example, the options may be presented by the interface 128, which is also shown by way of example in FIG. 5. The options may include selection and/or creation of parameters, such as restrictions, limitations, expirations, and/or other conditions for access to the account data 104 and/or use of the account data 104 by the agent 114.

At 408, the user 106 may select parameters 408. For example, when the user 106 is interacting with a dedicated application running on the user device 108, the user may enter selections in the parameter module 208, which may then transmit the parameters back to the host servers 112.

At 410, the token requestor 210 may request the token 118 to be created by the token generator 224.

At 412, the token generator 224 may create the token 118 that has the parameters, such as the conditions and/or other restrictions specified by the user 106 at the operation 408. In some embodiments, the parameters may or may not be stored with the token 118. For example, the parameters may be associated with token, but stored by the host servers 112 for use upon or after redemption of the token 118 by the agent 114.

At 414, the token generator 224 may transmit the token 118 to the user 106 (via the user device 108), the agent 114 (via the agent device 120), or both. When the token 118 is transmitted to the user 106 via the user device 108 at 416, the user 106 may then forward the token 118 to the agent and/or verbally communicate the token 118 to the agent 114, such as during a telephone call where the agent provides assistance to the user 106. For example, the user 106 may read a series of numbers, characters, and/or symbols (i.e., alphanumeric data) to the agent 114, who may input the token 118 into the transaction manager 216 for submission to the host servers 112. When the token 118 is transmitted to the agent 114 via the agent device 120 at 418, the user 106 may not need to take further action. Thus, the operation 416, the operation 418, or both may follow from the operation 414. In some instances, the operation 416 may not be necessary, as discussed above. Following receipt of the token 118 at the operation 418, the agent 114 may redeem the token as discussed below.

At 420, the transaction manager 216 may provide authentication information and/or the token 118 to the host servers 112. In some embodiments, the agent 114 may have credentials, a password, and/or other data that identifies the agent 114 to the host 102 prior to, during, or after redemption of the token 118. By requiring the credentials or other data, the host 102 may limit redemption of the token 118 to authorized entities/agents.

At 422, the authorization manager 228 may verify the credentials and/or token 118 provided at the operation 420 by the agent device 120. When the credentials or the token 118 is not valid (following the "no" route from the decision operation 422), the process 400 may continue to an operation 424 and reject the request (following the on-page references A-A shown in FIG. 4).

When the credentials and the token 118 is valid (following the "yes" route from the decision operation 422), the process 400 may continue to an operation 426 and allow the request to access at least a portion of the account data 104.

At 426, the transaction manager 216 may generate a request using at least some of the account data 104. The request may be a purchase of an item selected by the agent 114 for the user. The request may be placement of an item, selected by the agent 114, into a virtual shopping cart for later consumption by the user 106.

At 428, the transaction manager 216 may transmit the request to the transaction module 230 of the host servers 112. The transaction module 230 may receive the request at 430.

At 432, the transaction module 230 may determine whether an approval is needed by the user 106 to process the request. When an approval is not required from the user 106 (following the "no" route from the decision operation 432), then the process 400 may advance to an operation 434 and implement the request.

When an approval is required by the user 106 (following the "yes" route from the decision operation 432), then the process 400 may advance to an operation 436. At 436, the authorization manager 228 may transmit an authorization request to the user 106 via the user device 108.

At 438, the user 106 may approve or deny the request received at the operation 436. When the request is approved (following the "yes" route from the decision operation 438), then the process 400 may advance to the operation 434 and implement the request.

When the request is not approved (following the "no" route from the decision operation 438), then the process 400 may advance to the operation 424 and deny the request.

Illustrative Interface

Figure 5:
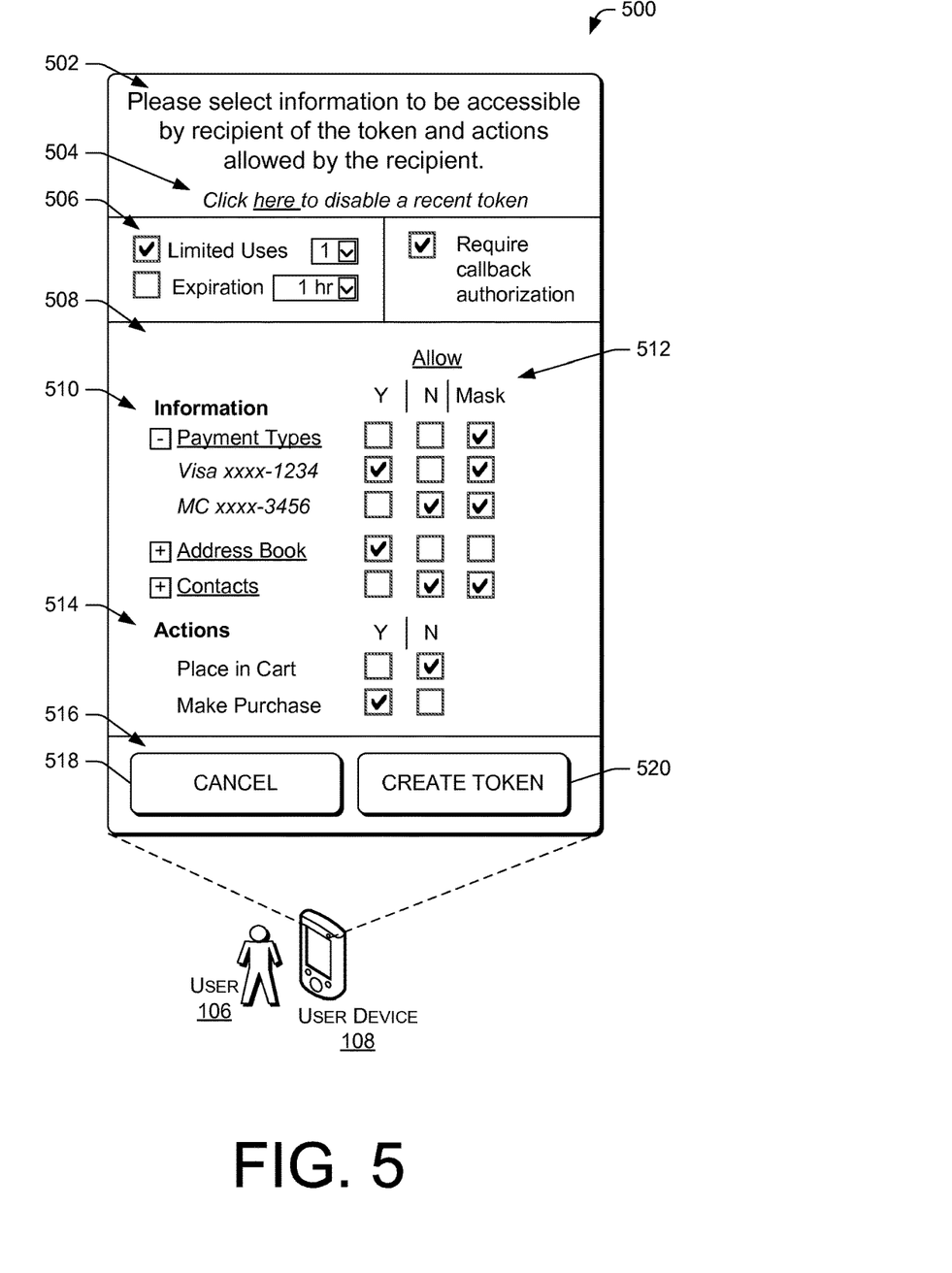
FIG. 5 is an illustrative user interface (UI) that enables a user to select information to be accessible by a holder of the token and/or actions allowed by the holder of the token.

FIG. 5 is an illustrative user interface (UI) 500 that enables a user to select information to be accessible by a holder of the token (e.g., the agent/entity) and/or actions allowed by the holder of the token. The UI 500 is an example of the interface 128 shown in FIG. 1.

The UI 500 may include an information section 502, which may include instructions, disclaimers, and so forth. The information section 502 may include an option 504 to disable to pending token.

The UI 500 may include an expiration section 506. The expiration section 506 may allow the user 106 to select a number of uses of the token 118 by the agent 114 before the token expires. For example, a selection of one use would allow the agent 114 to access at least a portion of the account data 104 only once. Additional access by the agent 114 (at different times, etc.) would require additional authorizations, resulting in deployment of at least one new authorized by the user 106. The expiration section 506 may also allow the user to limit a duration of time that the token 118 is valid, such as to cause the token to expire after a predetermined amount of time. Both a quantity limit of redemptions/accesses and duration of time may be specified by the user 106 in some instances.

The UI 500 may also include an itemized authorization section 508. The itemized authorization section 508 may include information items 510 that can be authorized (allowed) for use/manipulation by the agent 114 having the token 118. Examples of the information items 510 include payment types (e.g., specific credit cards, bank accounts, stored value cards, credits, etc.), address books, contacts, and so forth. The information items 510 may be associated with permissions 512, which may include "y" to allow, "n" to not allow, and "mask" to mask (obscure) at least part of the data to prevent reproduction of the data, such as a complete shipping address of a person. A masked shipping address may include a street number and street name, for example, but may omit a city, state, and zip code. Similarly a masked payment type may include generic characters that represent the actual payment type number, such as "xxxx-xxxx-xxxx-1234" for a credit card number.

The itemized authorization section 508 may include action items 514, which are also associated with the permissions 512. The action items 514 may include actions authorized by the agents 114 that have the token 118. Examples of the action items 514 include an action to place an item in a virtual shopping cart stored in the account data 104 of the user 106, an action to make a purchase on behalf of the user 106 using one of the payment types, and so forth.

The UI 500 may include a control section 516, which may enable the user to select a "cancel" command 518 or a "create token" command 520. The "create token" command may cause creation of the token 118 that includes the selections in the expiration section 506 and the itemized authorization section 508.

Figure 6:
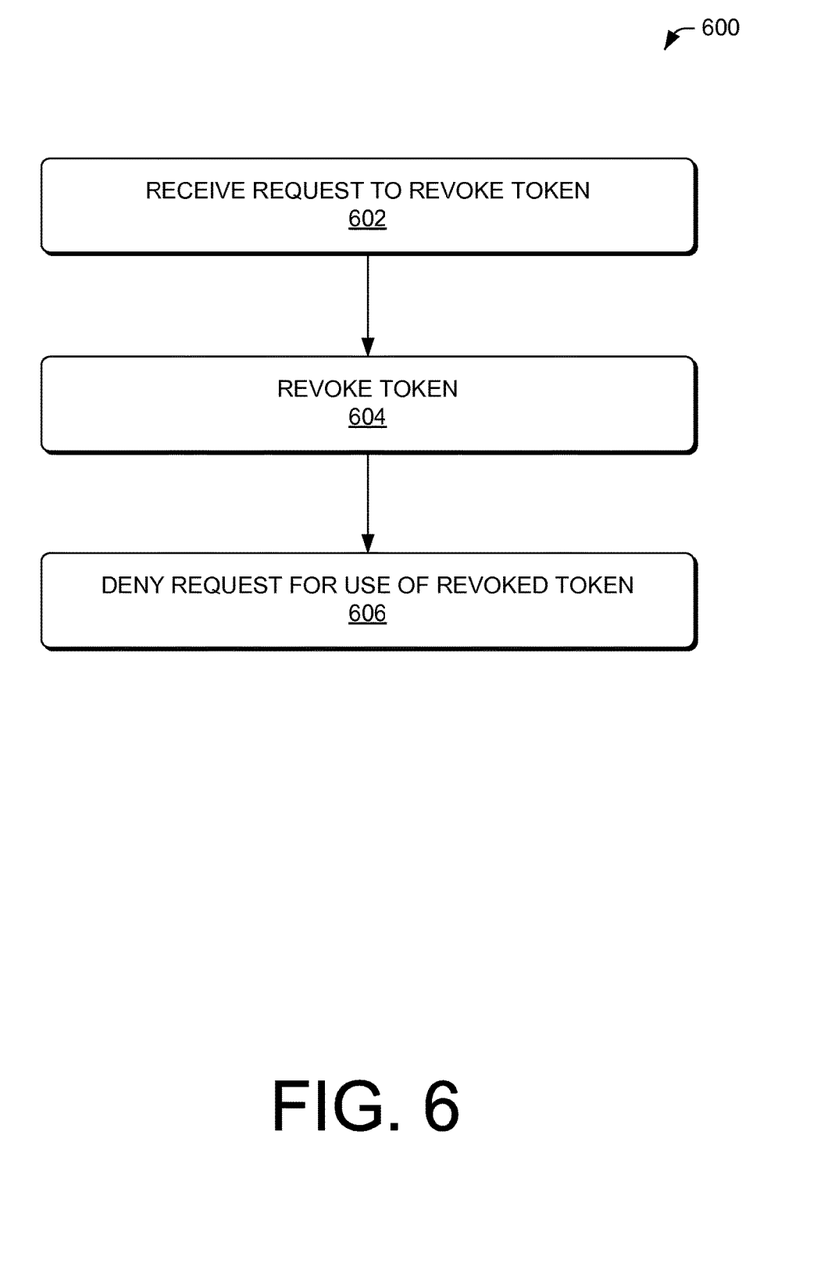
FIG. 6 is a flow diagram of an illustrative process to revoke a token.

FIG. 6 is a flow diagram of an illustrative process 600 to revoke a token. The process 600 is described with reference to the environment 100 and may be performed by the host servers 112.

At 602, the host servers 112 may receive a request to revoke the token 118. For example, the request to revoke the token 118 may be made by the user 106 or by the host 102 (such as to prevent fraudulent activity with the account data 104).

At 604, the host servers 112 may revoke the token 118. The revocation may be performed by removing the token 118 from a white list of tokens, flagging the token as revoked, or by other techniques that ultimately prevent use of the token 118.

At 606, the host servers 112 may deny a request to use the token 118 after the token is revoked.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system providing temporary third-party access to an account of a user, the system comprising:

a host computing device including memory and one or more processors, the host computing device maintaining the account of the user and an electronic marketplace of a third-party merchant, wherein the host computing device enables an agent of the third-party merchant to conduct a transaction with the third-party merchant on behalf of the user using the account of the user and without creating a different account; and an agent device operable by an agent of the third-party merchant; and wherein the host computing device includes computer-executable instructions maintained in the memory which, when executed by the one or more processors, performs operations comprising:

receiving, from a user device, a first request to transact with the third-party merchant using the electronic marketplace;

authenticating the user to access the account of the user;

establishing, via a marketplace application installed on the user device, a communication session between the user device and the agent device;

receiving, via the marketplace application, a second request to generate a token, wherein the second request includes parameters indicating one or more actions performable by the agent on behalf of the user, and wherein the token authorizes the agent device to access the account of the user;

generating, based at least in part on receiving the second request, the token;

associating the parameters with the token;

transmitting the token to at least one of the user device or the agent device;

receiving, from the agent device, a third request to access the account of the user, the third request including at least the token;

verifying an authenticity of the token;

receiving, via the marketplace application and based at least in part on verifying the authenticity of the token, at least one action of the one or more actions from the agent device, the at least one action based at least in part on information conveyed from the user to the agent during the communication session, the at least one action satisfying the parameters;

receiving, from the user device, a confirmation authorizing the at least one action; and performing, based at least in part on receiving the confirmation, the at least one action.

2. The method as recited in claim 1, further comprising providing account data to the agent based at least in part on the verifying the authenticity of the token, wherein the account data corresponds to the account of the user.

3. The method as recited in claim 1, wherein the one or more actions include placing an item in a virtual shopping cart.

4. The method as recited in claim 1, wherein the one or more actions include purchasing an item on behalf of the user using payment information stored in the account of the user.

5. The method as recited in claim 1, further comprising:

authenticating the agent, and wherein account data corresponding to the user is provided to the agent device based at least in part on the authenticating the agent and the verifying the authenticity of the token.

6. A method, comprising:

establishing, via a marketplace application installed on a user device associated with a user, a communication session between the user device and a sales representative device associated with a sales representative of a third-party merchant;

maintaining, by a host computing device, an account of the user and an electronic marketplace of the third-party merchant;

receiving, from the user device via the marketplace application, a first request to generate a token, wherein the token allows the sales representative device to access the account of the user on behalf of the user and without creating a different account;

generating, by the host computing device and based at least in part on receiving the first request, the token;

associating the token with parameters, the parameters including at least an expiration of the token;

transmitting the token to the user device;

receiving, from the sales representative device and based at least in part on the user providing the token to the sales representative during the communication session, a second request to redeem the token;

verifying that the second request satisfies the parameters;

providing, based at least in part on verifying the second request, the sales representative with access to the account of the user;

receiving, during the communication session and based at least in part on information conveyed from the user to the sales representative while the sales representative is assisting the user in selecting an item for purchase, one or more actions associated with account data or the account of the user;

receiving, from the user device, a confirmation authorizing the one or more actions; and performing, based at least in part on receiving the confirmation, the one or more actions, wherein the one or more actions include at least placing the item in a virtual shopping cart associated with the account of the user.

7. The method as recited in claim 6, wherein the one or more actions further include purchasing the item on behalf of the user, the item being a customized item or a special order item selected by the sales representative based at least in part on the information conveyed to the sales representative.

8. The method as recited in claim 6, wherein the account of the user includes at least one payment type and at least one shipping address.

9. The method as recited in claim 6, wherein the access allows the sales representative to perform at least one of adding the item to the account of the user or purchasing the item using a payment type stored in the account of the user.

10. The method as recited in claim 9, wherein the parameters further include designating the payment type to be used based at least in part on the sales representative purchasing the item on behalf of the user.

11. The method as recited in claim 9, further comprising causing purchase of the item using the payment type stored in the account of the user.

12. The method as recited in claim 6, wherein the access allows the sales representative to access at least a portion of the account data in the account of the user, the account data including at least one of payment information, contact information, or transaction information.

13. The method as recited in claim 6, wherein the access allows the sales representative to modify the account data by performing at least one of processing a return, updating payment information, updating contact information, or updating transaction information.

14. The method as recited in claim 6, further comprising:
receiving, from the sales representative device, sales representative credentials, and wherein
providing the sales representative access to the account of the user is based at least in part on verifying the sales representative credentials.

15. The method as recited in claim 6, further comprising:
encrypting, prior to the transmitting the token, the token.

16. The method as recited in claim 6, wherein the token is a unique alphanumeric code generated based at least in part on receiving the first request.

17. The method as recited in claim 6, wherein at least one of the parameters causes at least some of the account data corresponding to the account of the user to be masked from the sales representative.

18. One or more non-transitory computer-readable media storing computer-executable instructions that, when executed on one or more processors, performs acts comprising:
establishing, via a marketplace application installed on a user device associated with a user, a communication session between the user device an agent device associated with an agent;
receiving, by a host computing device via the marketplace application, a first request to generate a digitally encrypted token, wherein the digitally encrypted token provides at least limited access to data in an account of the user based at least in part on a redemption of the digitally encrypted token;
generating, by the host computing device and based at least in part on receiving the first request, the digitally encrypted token;
receiving, from the agent device, the digitally encrypted token;
verifying an authenticity of the token;
receiving, by the host computing device, at least one of agent credentials or an agent password;
redeeming, based at least in part on the verifying and receiving the at least one of the agent credentials or the agent password, the digitally encrypted token;
receiving, from the agent device and based at least in part on information communicated between the agent device and the user device during the communication session, a selection of an item from the agent on behalf of the user;
receiving, from the user device, a confirmation authorizing the selection of the item from the agent; and
receiving, from the agent device and based at least in part on receiving the confirmation, a second request to at least:
access at least a portion of the data in the account of the user, or
modify at least the portion of the data in the account of the user.

19. The one or more non-transitory computer-readable media as recited in claim 18, wherein the second request includes at least a purchase request to purchase the item on behalf of the user using payment information included in the account of the user.

20. The one or more non-transitory computer-readable media as recited in claim 18, wherein the selection of the item is contingent on the agent credentials being correct credentials.

21. The one or more non-transitory computer-readable media as recited in claim 18, wherein the digitally encrypted token is received by the agent directly from the host computing device.

22. The one or more non-transitory computer-readable media as recited in claim 18, wherein receiving the digitally encrypted token includes receiving input of the digitally encrypted token into a data field used for submission of the digitally encrypted token to the host computing device.

23. The one or more non-transitory computer-readable media as recited in claim 18, wherein the selection of the item includes at least one of a customization of the item or information provided by the user during the communication session.

24. The one or more non-transitory computer-readable media as recited in claim 18, wherein the communication session includes voice-based communication during which the user and the agent verbally interact while the agent selects the item.

25. The method as recited in claim 6, wherein the token is provided to the sales representative during the communication session between the sales representative device and the user device.

26. The one or more non-transitory computer-readable media as recited in claim 18, wherein the digitally encrypted token is associated with a quantity limit of redemptions.

* * * * *